US011546519B2

(12) United States Patent
Bhatia et al.

(10) Patent No.: US 11,546,519 B2
(45) Date of Patent: Jan. 3, 2023

(54) INTELLIGENT IMAGE CAPTURE MODE FOR IMAGES INVOLVING REFLECTIVE SURFACES

(71) Applicant: QUALCOMM Incorporated, San Diego, CA (US)

(72) Inventors: Palak Bhatia, Delhi (IN); Venkata Naga Poleswara Rao Karuchula, Hyderabad/Andhra Pradesh (IN)

(73) Assignee: QUALCOMM Incorporated, San Diego, CA (US)

( * ) Notice: Subject to any disclaimer, the term of this patent is extended or adjusted under 35 U.S.C. 154(b) by 320 days.

(21) Appl. No.: 16/779,316

(22) Filed: Jan. 31, 2020

(65) Prior Publication Data

US 2021/0243346 A1 Aug. 5, 2021

(51) Int. Cl.
*H04N 5/235* (2006.01)
*G06V 20/10* (2022.01)
*G09G 5/10* (2006.01)
*G06N 3/04* (2006.01)

(52) U.S. Cl.
CPC ............ *H04N 5/2351* (2013.01); *G06N 3/04* (2013.01); *G06V 20/10* (2022.01); *G09G 5/10* (2013.01); *G09G 2320/0626* (2013.01)

(58) Field of Classification Search
CPC ........ H04N 5/2351; G06N 3/08; G06V 20/10; G09G 5/10; G09G 2320/0626
See application file for complete search history.

(56) References Cited

U.S. PATENT DOCUMENTS

| 2016/0028965 | A1* | 1/2016 | Horii ................... H04N 5/225 348/333.01 |
| 2016/0110848 | A1 | 4/2016 | Gray et al. |
| 2018/0007240 | A1 | 1/2018 | Rivard et al. |
| 2018/0114493 | A1 | 4/2018 | McLaughlin |
| 2019/0102872 | A1* | 4/2019 | Moussa ..................... G06T 5/50 |
| 2019/0191153 | A1 | 6/2019 | Speigle et al. |

* cited by examiner

*Primary Examiner* — Ahmed A Berhan
(74) *Attorney, Agent, or Firm* — Polsinelli LLP

(57) ABSTRACT

Systems and methods for capturing one or more images include a smart capture mode for detecting one or more reflective objects in an image to be captured by a device, and determining whether a display provided in the device will cause a disturbance when the image is captured, the disturbance based on one or more reflections of the display on the one or more reflective objects. A brightness of the display is adjusted prior to capturing the image based on determining that the display will cause the disturbance, where adjusting the brightness of the display reduces the disturbance in the image when the image is captured. The brightness of the display can be adjusted by dimming or turning off the display. The display can be returned to a previous state upon capturing the image, the previous state being prior to the brightness of the display being adjusted.

30 Claims, 7 Drawing Sheets

INTELLIGENT IMAGE CAPTURE MODE FOR IMAGES INVOLVING REFLECTIVE SURFACES

FIELD

The present disclosure generally relates to image processing, and more specifically to detecting objects which include reflective surfaces and intelligently minimizing disturbances which can be caused by the reflective surfaces in images of the objects.

BACKGROUND

Electronic devices such as digital cameras, mobile phones, laptops, and others can be used for capturing digital images or video frames. Some electronic devices may also have a light emitting source such as a display or screen. In some examples, the display can provide a preview of an image to be captured. In some examples of multi-tasking, other content may be displayed on the display of the electronic device at the time of image capture. It is possible that the light emitted from the display can cause disturbances in the image to be captured in certain situations. It is important to detect such situations and minimize or eliminate the disturbances from light emitting sources to improve the quality of the images.

BRIEF SUMMARY

In some examples, techniques are described for capturing one or more images. In some examples, disturbances which can be caused due to reflections of light (e.g., from a display or screen of a device) are minimized or eliminated using the techniques described herein. For instance, the disturbances can include one or more reflections of a display of a device being present in an image captured by the device. In some examples, the display of the device (e.g., a mobile phone, laptop, tablet, etc.) used for capturing an image of a scene can be oriented toward (e.g., facing toward) a subject of the image when the image is captured. In one illustrative example, a device can be used for capturing a self-portrait, which includes an image in which a photographer capturing the image may be present in the image. Reflective objects such as spectacles worn by the photographer or user can reflect the light emitted from the display of the device, where the reflection from the light emitted from the display of the device being present in the captured image introduces disturbances in the captured image.

In some examples, a "smart capture mode" is disclosed for capturing images (e.g., self-portraits) when a display of the capturing device is oriented toward one or more subjects being captured in the image. In the smart capture mode, one or more reflective objects can automatically be detected in a scene (e.g., in a preview of the scene) to be captured by the device. In some cases, a disturbance detection system can be used for determining whether the display will cause a disturbance in the image when one or more reflective objects are detected in the scene. The brightness of the display can be adjusted. Adjusting the brightness of the display can include dimming, turning off the display, or displaying a dark or black light on the display prior to capturing the image. Adjusting the brightness of the display in this manner can minimize or eliminate the disturbance caused by the reflection of the display being present in the image when the image (e.g., self-portrait) is captured.

According to at least one example, a method for capturing one or more images is provided. The method includes detecting, by a computing device, one or more reflective objects in a scene. The method further includes determining whether a display provided in the computing device will cause a disturbance when an image of the scene is captured by the computing device, the disturbance being based on one or more reflections of the display on the one or more reflective objects. The method further includes adjusting a brightness of the display prior to capturing the image based on determining that the display will cause the disturbance.

In another example, an apparatus for capturing one or more images is provided. The apparatus includes a memory and a processor implemented in circuitry. The apparatus is configured to and can detect one or more reflective objects in a scene. The apparatus is further configured to and can determine whether a display provided in the apparatus will cause a disturbance when an image of the scene is captured by the apparatus, the disturbance being based on one or more reflections of the display on the one or more reflective objects. The apparatus is further configured to and can adjust a brightness of the display prior to capturing the image based on determining that the display will cause the disturbance.

In another example, a non-transitory computer-readable medium is provided that has stored thereon instructions that, when executed by one or more processors, cause the one or more processors to: detect one or more reflective objects in a scene; determine whether a display provided in a computing device will cause a disturbance when an image of the scene is captured by the computing device, the disturbance being based on one or more reflections of the display on the one or more reflective objects; and adjust a brightness of the display prior to capturing the image based on determining that the display will cause the disturbance.

In another example, an apparatus for capturing one or more images is provided. The apparatus includes: means for detecting one or more reflective objects in a scene; means for determining whether a display provided in the apparatus will cause a disturbance when an image of the scene is captured by the apparatus, the disturbance being based on one or more reflections of the display on the one or more reflective objects; and means for adjusting a brightness of the display prior to capturing the image based on determining that the display will cause the disturbance.

In some aspects of the methods, apparatuses, and computer-readable medium described above, adjusting the brightness of the display prior to capturing the image comprises dimming the display or turning off the display.

In some aspects of the methods, apparatuses, and computer-readable medium described above, adjusting the brightness of the display prior to capturing the image comprises displaying a dark light or black light.

Some aspects of the methods, apparatuses, and computer-readable medium described above, further include returning the display to a previous state upon capturing the image, the previous state being prior to the brightness of the display being adjusted.

In some aspects of the methods, apparatuses, and computer-readable medium described above, previous state comprises a preview of the scene displayed on the display.

In some aspects of the methods, apparatuses, and computer-readable medium described above, detecting the one or more reflective objects comprises using one or more machine learning operations for recognizing the one or more reflective objects.

In some aspects of the methods, apparatuses, and computer-readable medium described above, determining whether the display will cause the disturbance when the image is captured comprises using one or more machine learning operations for determining whether one or more factors associated with the display and the one or more reflective objects will cause the disturbance in the image.

In some aspects of the methods, apparatuses, and computer-readable medium described above, the one or more factors include one or more relative positions between the display and the one or more reflective objects, ambient light, brightness of the display, or shapes of the one or more reflective objects.

In some aspects of the methods, apparatuses, and computer-readable medium described above, determining whether the display will cause the disturbance when the image is captured comprises using one or more machine learning operations for recognizing a reflection of the display in the scene.

In some aspects of the methods, apparatuses, and computer-readable medium described above, capturing the image comprises capturing a self-portrait using a front facing camera of the computing device, the front facing camera oriented in a direction aligned with the display.

Some aspects of the methods, apparatuses, and computer-readable medium described above, further include retaining the brightness of the display while capturing the image upon determining that the display will not cause the disturbance.

In some aspects of the methods, apparatuses, and computer-readable medium described above, the one or more reflective objects comprise one or more spectacles, helmet visors, reflective wearable devices, or reflective background surfaces.

In some aspects of the methods, apparatuses, and computer-readable medium described above, detecting one or more reflective objects in the scene comprises detecting one or more reflective objects in a preview of the scene displayed on the display.

In some aspects of the methods, apparatuses, and computer-readable medium described above, the disturbance includes one or more reflections of the display being present in the image of the scene captured by the computing device.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
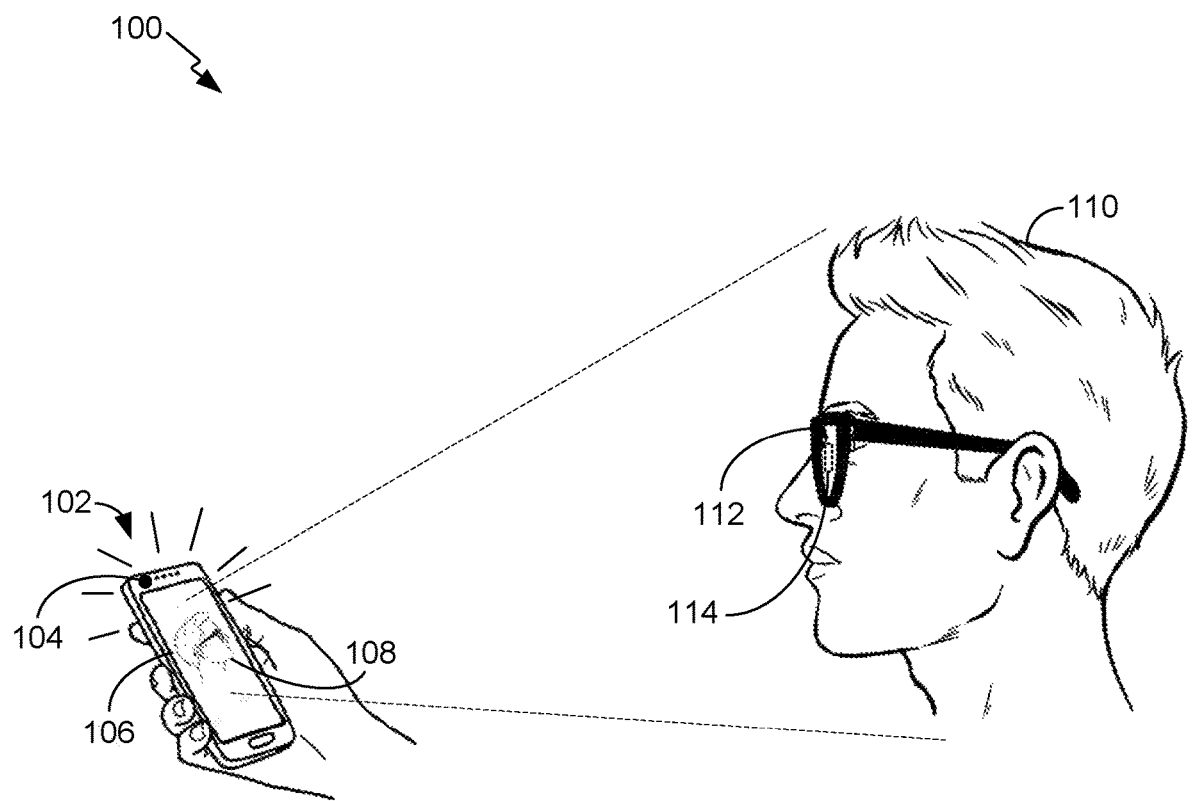
FIG. 1 is a diagram illustrating an example environment in which aspects of this disclosure may be applicable.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

In some examples, a digital camera or a device which includes digital imaging capabilities can be used to capture an image. In some examples, a display of the device can be oriented toward (e.g., facing toward) a subject of the image when the image is captured. Such an image is referred to as a candidate image. An example of a candidate image is a self-portrait. A self-portrait, also referred to colloquially as a "selfie," includes an image in which a photographer capturing the image may be present in the image. For example, mobile phones with cameras (or other devices such as laptops, tablets, etc.) can be used to capture self-portraits, where the photographer may hold the smartphone in his/her hand or a "selfie stick", and view the image to be captured on a display of the mobile phone before proceeding to capture the image. The display can include a light emitting source such as a liquid crystal display (LCD), light emitting diode (LED), organic LED (OLED), fluorescent backlights, etc.

In some examples, the image to be captured in the candidate image could include a reflective surface, such as spectacles worn by one or more subjects being photographed. In such examples, light emitted by the display can be reflected in the reflective surface. The reflection of the display can appear in the captured image (candidate image). The reflection of the display being present in the captured image may be undesirable. In some situations, to avoid the effect of the display's reflection being captured, the photographer may attempt a different distance or angle of capture, which can limit the desirable or optimal choices for capturing the image. Current technologies do not offer solutions to prevent or minimize the effect of the display's reflection appearing in the captured image.

In some examples, capturing the candidate image can be performed using a front facing camera of the device. The front facing camera is typically located in close proximity to the display of the device to enable a preview of the image to be captured to be displayed on the display. For example, the front facing camera and the display can be located on a common plane and oriented in the same direction. For example, the front facing camera may be situated along a boundary of the display. In some examples, selecting the front facing camera for capturing images can cause a preview of the candidate image to be displayed on the display or on a portion of the display.

In some examples, a "smart capture mode" is disclosed. In the smart capture mode, the display of the device (e.g., a mobile phone, laptop, tablet, etc.) can be dimmed or turned off at the time of capturing a candidate image in instances where a reflective surface may be involved in the candidate image being captured. Dimming or entirely turning off the display can minimize or prevent the disturbances which can be caused due to reflection of the display on the reflective surface. In some examples, the smart capture mode can be activated to dim or turn off the display intelligently upon detecting a reflective surface upon which a reflection of the display can cause an undesirable effect or disturbance. In some examples, a user may be manually enter or activate the smart capture mode. In some examples, the device may automatically enter the smart capture mode when capturing images using the front facing camera based on one or more applications or configuration settings which may be used. When in the smart capture mode, the display can be temporarily dimmed or turned off at the time of image capture.

In some examples, the smart capture mode may be used for capturing still images. In some examples, the smart capture mode may also be used for capturing videos. In the case of a video, a video frame can include two or more images. The smart capture mode can be used to temporarily dim or turn off the display or a portion of the display for a duration of time which can extend throughout the video capture or for a portion of the video.

In some examples, one or more object detection and/or recognition techniques can be used to automatically detect reflective surfaces in a smart capture mode. In some examples, one or more techniques can be used to assess whether the detected reflective surfaces can cause disturbances in an image to be captured (e.g., in the candidate image). For example, one or more techniques can be used to train a disturbance detection system, where the disturbance detection system can analyze whether a particular reflective surface may cause a reflection of the display to be captured in an image which includes the reflective surface. In some examples, artificial intelligence, machine learning, deep learning, or other techniques can be used to train the disturbance detection system. In some examples, the combination of the object detection and/or recognition techniques and the disturbance detection techniques can be used to adjust the brightness of the display by temporarily dimming or turning off the display at the time of image capture.

FIG. 1 is a diagram illustrating an example environment 100 in which aspects of this disclosure may be applicable. A device 102 can include a camera 104 and a display 106. In various examples, the device 102 can include any electronic device having at least one camera. For example, the device 102 can include laptops, smart phones, mobile phones, tablet devices or other small form factor personal computers, personal digital assistants, and so on.

Although reference is made to the camera 104, it will be understood the camera 104 can include a combination of one or more cameras, such as a digital camera, a digital video camera, one or more cameras of a mobile phone, tablet, personal computer, virtual reality (VR) device (e.g., a head-mounted display (HMD), a heads-up display (HUD), or other VR device), augmented reality (AR) device (e.g., AR glasses or other AR device), a gaming system, teleconference system, security system, etc. In some examples, the camera 104 can include a front facing camera configured to capture one or more images in an orientation or direction which aligns with the display 106.

In some examples, the display 106 can include any suitable display for displaying images previewed through lens of the camera 104. For example, the display 106 can include an LED, LCD, OLED, or other display. In some examples, the display 106 can include a touch-screen display. In some examples, the display 106 can display multiple windows or sections. In some examples, the display 106 can emit light of varying intensities. A brightness of the display 106 can be adjusted. In some examples, the display 106 can be turned on, turned off, dimmed, and/or made brighter based on input received from a user (e.g., through a touch screen input or other controls provided in the device 102). In some examples, the display 106 can be caused to turn on, turn off, be dimmed, and/or made brighter, based on commands or control functions generated by one or more mechanisms for reducing disturbance caused by the light emitted from the display 106.

In some examples, the device 102 can be used for capturing a candidate image. For example, a user 110 can be a subject of a self-portrait captured using the device 102. For example, the user 110 can provide an input to the device 102 (e.g., through a touch screen input, one or more control buttons, voice commands, or other input) to cause the camera 104 to preview images of the user 110. In some examples, the display 106 can display one or more preview images, shown for example, as a preview image 108. The user 110 can use the preview image 108 to make any modifications as desired before capturing the candidate image. For example, the modifications can include modifying an angle, view, brightness settings, pixel resolution settings, aspect ratio settings, modifications which can be added prior to capture (e.g., using augmented reality applications), etc. When the user 110 is satisfied with the modifications, if any, the user 110 can proceed to capture the image represented by the preview image 108. For example, the user 110 can provide an input through one or more buttons, touch-screen settings, voice command, timer functions, or other input to cause the camera 104 to capture the preview image 108. Capturing the preview image 108 can include saving a digital version of the image to a memory in the device 102, after possibly providing a temporary display of the captured image.

In some examples, the subject of the captured image can include one or more reflective surfaces. For example, the user 110 can be wearing glasses or spectacles 112. At certain angles or positions the light emitted by the display 106 can be reflected on the spectacles 112. A reflection 114 has been identified as an example of such a reflection of the display 106 on the glasses 112. In such examples, the preview image 108 and the subsequently captured candidate image can include the reflection 114. The presence of the reflection 114 in the candidate image can be considered undesirable by some users, and is referred to herein as a disturbance to the candidate image. Some users may go to additional trouble to avoid such disturbances. For example, they may try adjusting the light settings in the environment 100, modify an angle of capture which may avoid or minimize the reflection 114, choose not to wear the spectacles 112, or attempt some other fix. However, such fixes may not be desirable or preferred by the user 110. In example aspects, the disturbances can be minimized or avoided by configuring the device 102 to automatically identify the situations in which such disturbances may occur and temporarily dimming or turning off the display 106 at the time of capture (e.g., a small time delta prior to the camera 104 capturing the candidate image). This way the light emitted from the display 106 can be minimized or eliminated, thereby minimizing or avoiding the reflection 114 and related disturbance in the candidate image. By limiting the time duration during which the display 106 is dimmed or turned off to a very small interval, only when necessary, the user experience may not significantly altered or compromised.

For example, the display 106 can be used for purposes in addition to or in lieu of displaying the preview image 108 prior to, during, and after capturing the candidate image. For example, the user 110 may be viewing other content on the display 106 (e.g., a video or browsing a website) while capturing a candidate image in parallel. In some examples, the preview image 108 can be displayed in a thumbnail or portion smaller than the entire display 106, for instance during a video conference in which the user 110 may be viewing another person on the display 106, while wanting to capture a self-portrait at a particular moment. It may be desirable to avoid a broad stroke approach to turning off the display 106 every time a candidate image is captured, because this could cause an undesirable loss of display or pause in another activity that the user 110 may be engaged in at the time of capturing the candidate image. Accordingly, in example aspects, the techniques for reducing disturbances by dimming or turning off the display 106 can be applied only in instances where a disturbance caused by the reflection 114 is predicted to be very likely (e.g., greater than a predetermined confidence value) and not applied otherwise.

In some examples, the potential loss of user experience which can be caused due to the temporary dimming or turning off the display can be weighed against the loss of user experience which may be caused due to the disturbance potentially appearing in the candidate image. For example, in some situations, such as when the user 110 may be using the display 106 for viewing other content, the user 110 may not wish to have any temporary dimming or turning off interference in their user experience of viewing the other content. In such situations, the user 110 may be willing to accept the disturbance in the candidate image captured while viewing the other content. However, if the user 110 is primarily using the display 106 to preview the candidate image prior to capture, the user 110 may find it acceptable to temporarily dim or turn off the display 106 being at the time of capture. Thus, the user 110 may be provided with options and configurable settings to flexibly enable or disable the use of the smart capture mode for automatically adjusting the display brightness for minimizing or eliminating disturbances in candidate image caused by reflections of the display 106. In some examples, the smart capture mode can also be automatically enabled or disabled based on one or more applications executing on the device 102.

In some examples of the smart capture mode, the display 106 can be dimmed or turned off temporarily prior to capturing the candidate image, and upon the candidate image being captured, the display 106 can be returned to its previous state or brightness level. In some examples, the device 102 can be placed in the smart capture mode using one or more user settings or inputs. In the smart capture mode, one or more reflective objects in an image to be photographed can be detected using one or more object detection and/or object recognition mechanisms. For example, artificial intelligence or machine learning algorithms can be used to detect spectacles or other known reflective surfaces in an image.

In some cases as noted above, the device 102 can include multiple cameras such as the camera 104 and/or the camera 104 can include multiple image sensors, in which case the image processing operations described herein can be applied to raw image data obtained by the multiple image sensors. For example, a device with multiple cameras can capture image data using the multiple cameras, and the display adjustments in the smart capture mode can be applied based on analyzing the raw image data from the multiple cameras. In one illustrative example, a dual-camera mobile phone, tablet, or other device can be used to capture larger images with wider angles (e.g., with a wider field-of-view (FOV)), capture more amount of light (resulting in more sharpness, clarity, among other benefits), to generate 360-degree (e.g., virtual reality) video, and/or to perform other enhanced functionality than that achieved by a single-camera device.

Figure 2:
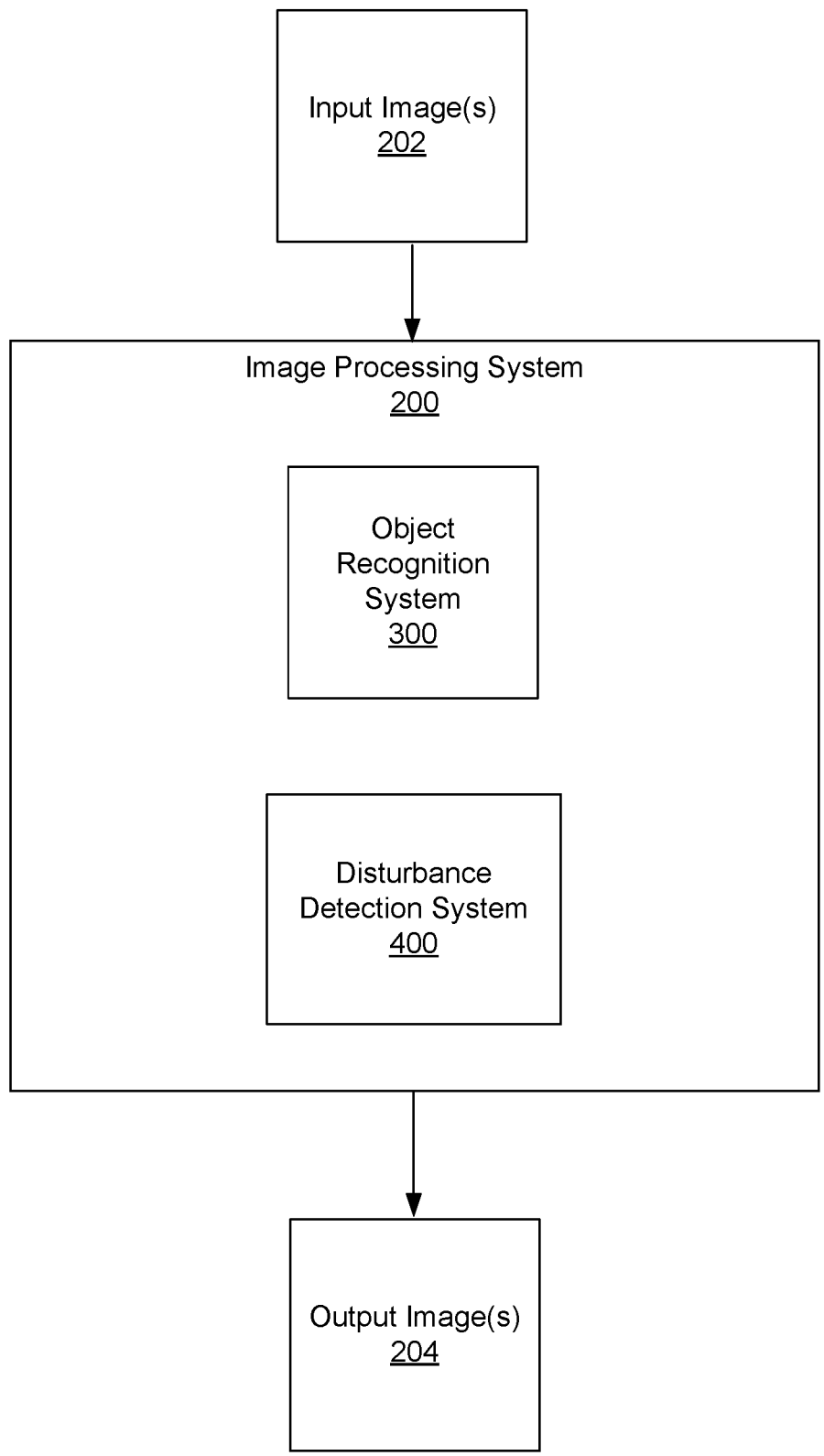
FIG. 2 is an example of an image processing system, in accordance with some examples.
Figure 3:
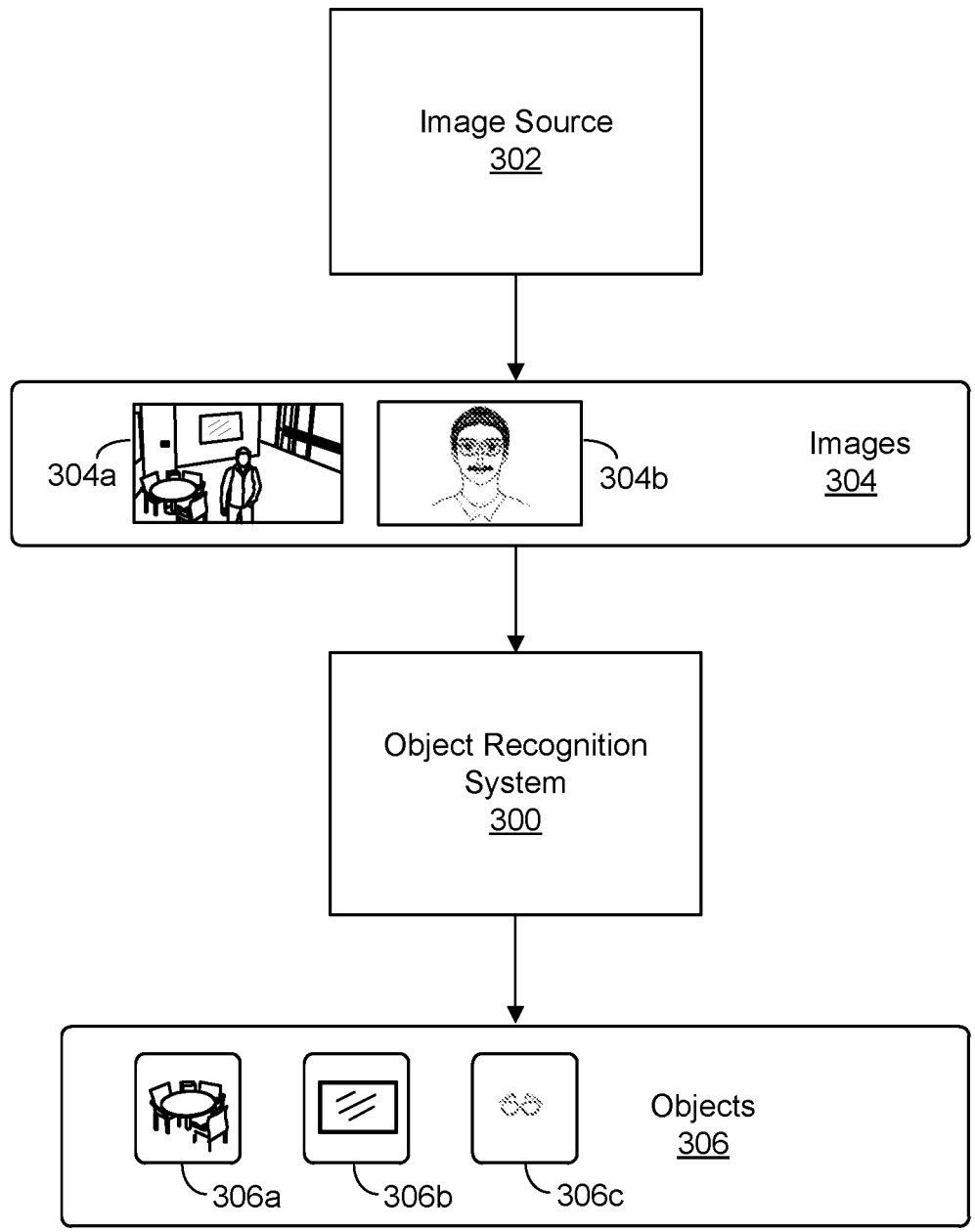
FIG. 3 is a block diagram illustrating an example of an object recognition system, in accordance with some examples.
Figure 4:
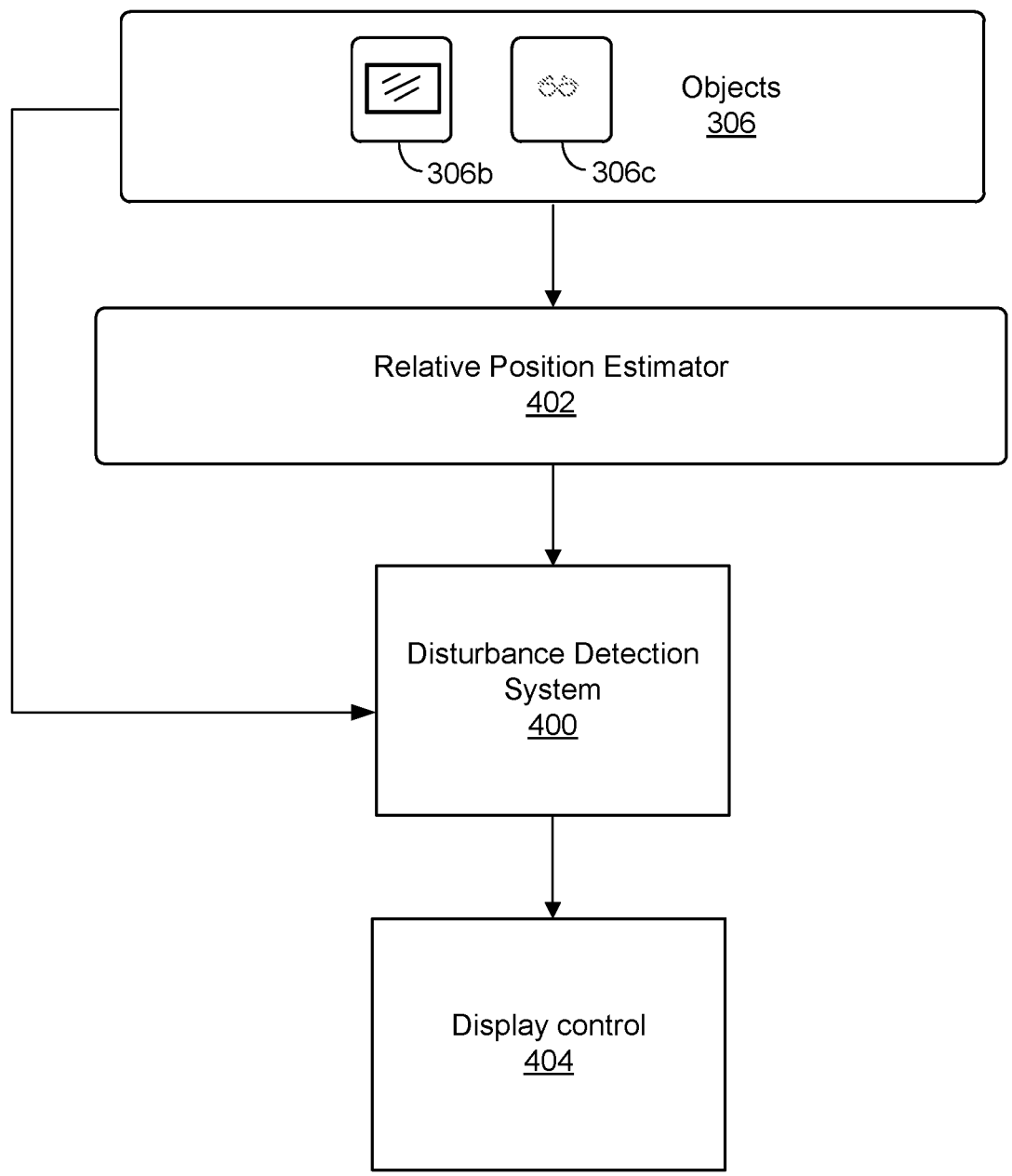
FIG. 4 is a block diagram illustrating an example of a disturbance detection system, in accordance with some examples.

FIG. 2 is a diagram illustrating an example of an image processing system 200 which can be provided in the device 102 according to some aspects. FIG. 2 illustrates high level details of one or more functional blocks which can be provided for capturing candidate images in the smart capture mode. FIG. 3 and FIG. 4 provide additional details of functional blocks such as an object recognition system 300 and a disturbance detection system 400, respectively.

The image processing system 200 includes various components, including an object recognition system 300, a disturbance detection system 400, a relative position estimator 402, and a display control 404. The components of the image processing system 200 can include software, hardware, or both. For example, in some implementations, the components of the image processing system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the computing device implementing the image processing system 200.

While the image processing system 200 is shown to include certain components, one of ordinary skill will appreciate that the image processing system 200 can include more or fewer components than those shown in FIG. 2. For example, the image processing system 200 can include, or can be part of a computing device that includes, one or more input devices and one or more output devices (e.g., the display 405 shown in FIG. 4 and/or one or more other output devices). In some implementations, the image processing system 200 may also include, or can be part of a computing device that includes, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices) in communication with and/or electrically connected to the one or more memory devices, one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

As noted above, the image processing system 200 can be implemented by and/or included in a computing device. In some cases, multiple computing devices can be used to implement the image processing system 200. For example, a computing device used to implement the image processing system 200 can include a mobile phone, a tablet computer, a laptop computer, a wearable device with a display or screen, a virtual reality device (e.g., a head-mounted display), an augmented reality device, and/or any other computing device with the resource capabilities to perform the techniques described herein.

In some implementations, the image processing system 200 can be integrated with (e.g., integrated into the software, added as one or more plug-ins, included as one or more library functions, or otherwise integrated with) one or more software applications, such as a software application that allows a user (also referred to as an end-user) to capture and/or edit images. The software application can be a mobile application installed on a mobile device (e.g., a mobile phone, such as a smartphone, a tablet computer, a wearable device, or other mobile device), a desktop application installed on a laptop computer, a web-based application that can be accessed using a web browser or other application, or other software application. In some implementations, the image processing system 200 can be implemented in a suite of software applications.

In some examples, the image processing system 200 can obtain one or more input images 202 from an image source such as the camera 104 of FIG. 1. In some examples, the input images 202 can include a preview of one or more images to be captured. The object recognition system 300 can implement one or more object detection and/or recognition mechanisms to detect one or more reflective objects in the one or more images 202. In some examples, the disturbance detection system 400 can detect whether the display 106 can cause a disturbance in the one or more detected reflective objects. In some examples, the reflective object detection by the object recognition system 300 and the disturbance detection by the disturbance detection system 400 can be separate processes, while in some examples they can be performed in a combined process. In some examples, one or more confidence levels may be associated with the reflective surface detection and disturbance detection. Based on the one or more confidence levels, display control functions from the display control 404 can be provided to adjust the display brightness of display 406. For example, the display 106 shown in FIG. 1 can be dimmed or turned off when a reflective surface has been detected and the display 106 has been determined to potentially cause a disturbance in the detected reflective surface. One or more output images can be generated in response to the adjustments to the display brightness. In some examples, the output images can be free of potential disturbances which may have been caused by the display 106 if the brightness of the display 106 was not adjusted as discussed above.

The relative position estimator 402 can include a system for determining positions associated with the display 106 and the objects 306b and 306c detected in an image. The relative position estimator 402 can provide the information to the disturbance detection system 400, which can determine whether a reflection can cause a disturbance on the display 406. Further details regarding the relative position estimator 402 are described below with respect to FIG. 4.

FIG. 3 is a block diagram illustrating an example of an object recognition system 300 for recognizing objects in one or more image frames. In some examples, the object recognition system 300 can be implemented in the image processing system 200 of FIG. 2. The object recognition system 300 can receive images 304 from an image source 302. The images 304 can include images or video frames. For example, the images 304 can include the input images 202 shown and described with reference to FIG. 2. The images 304 can also be referred to herein as pictures. The images 304 can each contain images of a scene in some examples. In some examples, the images 304 can include images of a scene which are viewed by the sensors or image sources but may not yet have been captured or saved. For example, the images 304 can include the preview image 108 of FIG. 1.

Two example images 304a and 304b are illustrated in the images 304 box of FIG. 3. The image 304a illustrates a room with a table and chairs, a person, and a mirror hanging on a back wall. The image 304b illustrates a person wearing spectacles. The image source 102 can include an image or video capture device such as the camera 104. In some examples, the image source 302 can include the camera 104. In some examples, the image source 302 can include one or more other digital cameras, video cameras, image storage devices, image archives containing stored images, image servers or content providers providing image data, video feed interfaces receiving video from a video server or content provider, computer graphics systems for generating computer graphics image data, a combination of such sources, or other source of image content.

The images 304 may be raster images composed of pixels (or voxels) optionally with a depth map, vector images composed of vectors or polygons, or a combination thereof. The images 304 may include one or more two-dimensional representations of an object (such as a face or other object) along one or more planes or one or more three dimensional representations of the object (such as a face or other object) within a volume. Where the image is three-dimensional, the image may be generated based on distance data (e.g., gathered using RADAR, LIDAR, SONAR, and/or other distance data), generated using multiple two-dimensional images from different angles and/or locations, or some combination thereof. Where the image is three-dimensional, the image may include only wireframe, voxel, and/or distance data, or may include such data that is also textured with visual data as well. Any visual data may be monochrome, greyscale (e.g., only luminosity data without color), partial-color, or full-color. The images 304 may have other data associated with RADAR, LIDAR, or SONAR recording, such as amplitude, phase, and magnitude as discussed further herein.

The object recognition system 300 can process the images 304 to detect and/or recognize objects 306 in the images 304. In some cases, the objects 306 can also be recognized by comparing features of the detected and/or tracked objects with enrolled objects that are registered with the object recognition system 300. The object recognition system 300 outputs objects 306 as detected and/or as recognized objects. Three example objects 306a-c are illustrated in the objects 306 box of FIG. 3. The object 306a includes the table and chairs recognized from the image 304a. The object 306b includes the mirror recognized from the image 304a. The object 306c includes the glasses recognized from the image 304b.

Any type of object recognition can be performed by the object recognition system 300. An example object recognition process identifies and/or verifies an identity (e.g., classifies) of an object from a digital image or a video frame of a video clip. In some cases, the features of the object are extracted from the image and compared with features of known objects stored in a database (e.g., an enrolled database). In some cases, the extracted features are fed to a classifier and the classifier can give the identity of the input features.

For example, the object recognition system 300 can perform object identification and/or object verification of objects which can include reflective surfaces. In the above examples, two reflective surfaces have been mentioned, a mirror in the image 304a and spectacles in the image 304b. An example of object recognition can include analyzing features of an image and comparing the features from one or more databases containing various types of reflective surfaces. For example, a mirror database can include various sizes, shapes, features, and/or other characteristics of mirrors. Similarly, a spectacles database can include spectacles of various brands, shapes, sizes, and/or other characteristics. Various other similar databases of reflective objects can include mirrored, glass, shiny, smooth, or other surfaces which have a high reflectance. For example, other such reflective objects in the context of this disclosure can include a window, a glass wall, a helmet visor, or other objects which can appear in an image which includes a candidate image, and potentially reflect light from a light source such as the display 106. In some examples, the extracted features from images 304 can be fed to a classifier and the classifier can give indicate whether a reflective object is present and provide an identity of such a reflective object.

Various examples of object identification can include processes to identify which object identifier a detected object may be associated with. A confidence level can be associated with this identification process. An object verification process which may be performed in conjunction with the object identification can include one or more processes to verify if the object identifier actually belongs to the object with which the object identifier is assigned. Objects can be enrolled or registered in an enrolled database that contains known objects. For example, any spectacles or glasses worn by the owner or faces of one or more known users in one or more images which have been previously captured, can be registered. In some cases, an owner of a camera containing the object recognition system 300 can register the owner's face and faces of other users, which can then be recognized by comparing later-captured images to those enrolled images. Similar enrollment of objects can be performed for other reflective objects, such as mirrors, glass objects, metal objects, hats, helmets, visors, reflective wearable devices, reflective background surfaces, and/or other reflective objects. The enrolled database can be located in the same device 102 as the object recognition system 300, or can be located remotely (e.g., at a remote server that is in communication with the object recognition system 300). The database can be used as a reference point for performing object identification and/or object verification.

Object identification and object verification present two related problems and have subtle differences. Object identification can be defined as a one-to-multiple problem in some cases. For example, object identification can be used to find a specific object from multiple objects. In some examples, object identification can be used to find reflective objects such as the objects 306b and 306c which can be present in images 304a and 304b, respectively. Object verification can be defined as a one-to-one problem. For example, object verification can be used to check if a detected object has been correctly identified.

For object identification, an enrolled database containing the features of enrolled objects can be used for comparison with the features of one or more given query object images (e.g., from input images 304 or frames). The enrolled objects can include objects registered with the system and stored in the enrolled database, which contains known reflective objects in one example. A most similar enrolled object can be determined to be a match with a query object image. An object identifier of the matched enrolled object (the most similar object) can be identified as belonging to the object to be recognized. In some implementations, similarity between features of an enrolled object and features of a query object can be measured with a distance calculation identifying how different (or "far apart") these values are, optionally in multiple dimensions. Any suitable distance can be used, including Cosine distance, Euclidean distance, Manhattan distance, Minkowski distance, Mahalanobis distance, or other suitable distance. One method to measure similarity is to use matching scores or confidence values. A matching score represents the similarity between features, where a very high score (e.g., exceeding a particular matching score threshold) between two feature vectors indicates that the two feature vectors are very similar or are similar with a high degree of confidence. In contrast, a low matching score (e.g., below the matching score threshold) between two feature vectors indicates that the two feature vectors are dissimilar or the similarity has low confidence. A feature vector for an object can be generated using feature extraction. In one illustrative example, a similarity between two objects (represented by an object patch) can be computed as the sum of similarities of the two object patches. The sum of similarities can be based on a Sum of Absolute Differences (SAD) between a probe patch feature (in an input image) and a gallery patch feature (stored in the database). In some cases, the distance is normalized to 0 and 1. As one example, the matching score can be defined as 1000*(1−distance).

In some cases, the matching score threshold may be computed by identifying an average matching score in images previously known to depict the same object. This matching score threshold may optionally be increased (to be stricter and decrease false positives) or decreased (to be less strict and decrease false negatives or rejection rate) by a static amount, multiplier and/or percentage, or a multiple of the standard deviation corresponding to that average.

Another illustrative method for object identification includes applying classification methods, such as a support vector machine (SVM) to train a classifier that can classify different reflective objects using given enrolled reflective object images and other training reflective object images. For example, the query reflective object features can be fed into the classifier and the output of the classifier will be the identifier of the reflective object.

For reflective object verification, a provided reflective object image can be compared with the enrolled reflective objects. This can be done with simple metric distance comparison or classifier trained with enrolled reflective objects. In some examples, reflective object verification can include higher recognition accuracy since it may be used for flexibly enabling or disabling the dimming or turning off of the display 106 according to aspects of this disclosure. A false positive can lead to poor user experience as mentioned above. For reflective object verification, a purpose is to recognize reflective objects with high accuracy but with low rejection rate. Rejection rate is the percentage of reflective object that are not recognized due to the matching score or classification result being below the threshold for recognition.

Metrics can be defined for measuring the performance of object recognition results. For example, in order to measure the performance of reflective object recognition algorithms, certain metrics can be defined. Reflective object recognition can be considered as a kind of classification problem. True positive rate and false positive rate can be used to measure the performance. One example is a receiver operating characteristic (ROC). The ROC curve is created by plotting the true positive rate (TPR) against the false positive rate (FPR) at various threshold settings. In a reflective object recognition scenario, true positive rate is defined as the percentage that a reflective object is correctly identified and false positive rate is defined as the percentage that a non-reflective object is wrongly classified as a reflective object. As previously mentioned, both reflective object identification and verification may use a confidence threshold to determine if the recognition result is valid. In some cases, all reflective objects that are determined to be similar to and thus match one or more enrolled reflective objects are given a confidence score. Determined matches with confidence scores that are less than a confidence threshold may be rejected. In some cases, the percentage calculation may not consider the number of reflective objects that are rejected to be recognized due to low confidence. In such cases, a rejection rate may also be considered as another metric, in addition to true positive and false positive rates.

With respect to rejection rates, true negative rates (TNR) and false negative rates (FNR) can similarly be used to measure the performance of classification. In a reflective object recognition scenario, false negative rate is defined as the percentage that a reflective object incorrectly fails to be identified in an image in which the reflective object is present, while true negative rate is defined as the percentage that the classifier correctly identifies that a reflective object is not present in an image.

If the false positive rate (FPR) exceeds a pre-determined threshold, then in some cases classification constraints may be "tightened" or "narrowed" or "made stricter" or "made more rigorous" so that it is more difficult to achieve a positive recognition, so as to reduce or eliminate unexpected recognition of the object. This may be achieved by increasing the matching score threshold and/or reducing confidence scores for positives and/or increasing confidence scores for negatives, for example by a static amount or using a multiplier/percentage. If the false negative rate (FNR) exceeds a pre-determined threshold, then in some cases classification constraints may be "loosened" or "relaxed" or "made easier" or "made more flexible" or "made more lax" so that it is easier to achieve a positive recognition, so as to reduce or eliminate unexpected failures to recognize of the object. This may be achieved by decreasing the matching score threshold and/or increasing confidence scores for positives and/or decreasing confidence scores for negatives, for example by a static amount or using a multiplier/percentage.

FIG. 4 is a block diagram illustrating an example of a disturbance detection system 400. In some examples, the disturbance detection system 400 can be used for detecting or determining whether the display 106 can be reflected on one or more reflective objects that may be recognized by object recognition system 300 discussed with reference to FIG. 3. In some examples, the disturbance detection system 400 can also be implemented in the image processing system 200 of FIG. 2.

In some examples, the disturbance detection system 400 can obtain the one or more objects 306 detected by the object recognition system 300. In some examples, only the relevant objects such as the reflective objects 306b and 306c may be provided to the disturbance detection system 400 as inputs. For example, when reflective objects have been detected and verified with a high confidence, the object recognition system 300 can forward these reflective objects 306b and 306c to the disturbance detection system 400.

In some examples, the disturbance detection system 400 can directly determine whether the one or more reflective objects 306b and 306c include a disturbance in the shape of a display. For example, the disturbance detection system 400 can utilize similar object detection and/or recognition techniques as discussed with reference to the object recognition system 300 to determine whether a display shape or a display reflection is present in the reflective object 306c by analyzing the preview image 108. In some examples, this detection can lead to a conclusion that there is potential disturbance. The disturbance detection system 400 can cause the display control 404 to dim or turn off the display 106 to minimize or eliminate such disturbance in such cases. In some examples, the disturbance detection system may also rely on the relative position estimator 402.

In some examples, the relative position estimator 402 can include a system for determining positions associated with the display 106 and the objects 306b and 306c detected in an image. In the illustrative example shown in FIG. 1, the object 306c may be detected as spectacles in the preview image 108. In some examples, upon determining the object 306c, the relative position estimator 402 may estimate a relative position between the object 306c and the display 106. Relative position estimation, as referred to herein, can include a determination of distance, angle, orientation, etc., of the object 306c and the display 106 as may be pertinent in determining whether light emitted by the display 106 can be reflected on the object 306c.

Reflection is a phenomenon of light bouncing off an object. If the surface of the object is smooth and shiny, like glass, water or polished metal, the light will reflect at the same angle as the angle at which the light is incident on the surface. This is called specular reflection, where the angle of incidence is equal to the angle of reflection. Another type of reflection called diffuse reflection refers to the phenomena where light hits an object and reflects in many different directions, such as when the surface of the object rough or can contain different surfaces and orientations. It is possible that some types of reflections of the display 106 can cause a reflection on the reflective object 306c which may lead to disturbance, while some reflections may not. Whether or not the reflection of the display 106 can cause a disturbance can be based on the relative positioning between the reflective object 306c and the display 106. In addition to the angle of incidence, the distance between the reflective object 306c and the display 106 can also play a factor because if the distance is high, the amount of reflection may not matter as much as if the distance is low.

In some examples, the relative position estimator 402 can use various depth analysis techniques for determining the distance between the device 102 (and correspondingly the display 106) and the reflective object 306c. In some examples, the device 102 can include one or more inertial measurement units for determining movement and/or rotational rate of the device 102 using one or more gyroscopes. In some examples, the device 102 can also include (or alternatively include) a magnetometer to provide a heading reference. In some examples, the device 102 can include one or more accelerometers, gyroscopes, and/or magnetometers per axis for position and/or motion characteristics of the device 102 to be measured in each of the three axes (referred to as pitch, roll, and yaw). For instance, the device 102 can determine a rate and degree of movement of the device 102, and correspondingly, the display 106 along a lateral axis (e.g., pitch), a longitudinal axis (e.g., roll), and/or a vertical axis (e.g., yaw). With the various positional and distance measurements, the relative position estimator 402 can estimate an angle of incidence of light emitted from the display 106 on the reflective object 306c.

In some examples, the disturbance detection system 400 can obtain the relative position or distance between the display 106 and the reflective object 306c, an estimated the angle of incidence of light emitted from the display 106 on the reflective object 306c, and/or other information and estimate whether the light emitted from the display 106 can cause a reflection on the reflective object 306c. Additionally, the disturbance detection system 400 can also obtain information about ambient lighting from light sensors or one or more image sensors provided in the device 102. The disturbance detection system 400 can use various mathematical models and/or machine learning algorithms to determine whether the reflection can cause a disturbance on the display 106. For example, certain combinations of distances, angles of reflections, orientations of the display 106, ambient lighting, and other factors can contribute to potential disturbances while other combinations may not. In some examples, various data points can be collected which are representative of these factors and machine learning techniques can be used to study these data points to predict whether certain combinations can cause potential disturbances. To improve the accuracy of detecting the combinations of factors which can cause potential disturbances, a complex detector can also be used to detect (e.g., classify and/or localize) factors which are known to cause disturbances. For example, a complex detector can be based on a trained classification neural network, such as a deep learning network (also referred to herein as a deep network and a deep neural network), to detect (e.g., classify and/or localize) the factors which can cause disturbances due to reflection of the display 106 in a candidate image to be captured by the camera 104. A trained deep learning network can identify the factors based on knowledge gleaned from training data points (or other data) that include similar factors indicating the classification. In some examples, when a potential disturbance has been detected, the display control 404 can include functions to generate commands for temporarily dimming and/or turning off the display 106.

A neural network can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the network includes feature maps or activation maps that can include nodes. A feature map can include a filter, a kernel, or the like. The nodes can include one or more weights used to indicate an importance of the nodes of one or more of the layers. In some cases, a deep learning network can have a series of many hidden layers, with early layers being used to determine simple and low level characteristics of an input, and later layers building up a hierarchy of more complex and abstract characteristics. For a classification network, the deep learning network can classify a combination of factors using the determined high-level features. The output can be a single class or category, a probability of classes that best describes the potential disturbance, or other suitable output which can cause the display control 404 to effect temporary dimming and/or turning off of the display 106 at the time of capturing a candidate image. For example, the output can include probability values indicating probabilities (or confidence levels or confidence values) that the relative positioning of the display 106 with respect to the detected reflective object 306c can lead to reflection of the display 106 on the reflective object 306c, where the reflection can appear in a candidate image and cause disturbance.

In some cases, nodes in the input layer can represent data, nodes in the one or more hidden layers can represent computations, and nodes in the output layer can represent results from the one or more hidden layers. In one illustrative example, a deep learning neural network can be used to determine whether a certain combination of relative positions, distances, angles of reflections, orientations of the display 106, ambient lighting, and other factors can contribute to potential disturbances. In such an example, nodes in an input layer of the network can include normalized values for relative distance, position, ambient light, display brightness, display orientation, etc., nodes in a hidden layer can be used to determine whether certain common combinations which can cause disturbances are present (e.g., a display orientation pointing straight at a user's face which has been detected to have reflective spectacles), and nodes of an output layer can indicate whether a potential disturbance has been detected or not. This example network can have a series of many hidden layers, with early layers determining low-level features of the combination of factors (e.g., display brightness, use of front facing camera 104 for a smart capture mode, and/or other low-level features), and later layers building up a hierarchy of more high-level and abstract features of the combination (e.g., ambient light, angle of incidence, and/or other features). Based on the determined high-level features, the deep learning network can classify the combination as causing potential disturbance or not. Further details of the structure and function of neural networks are described below with respect to FIG. 5 and FIG. 6.

Figure 5:
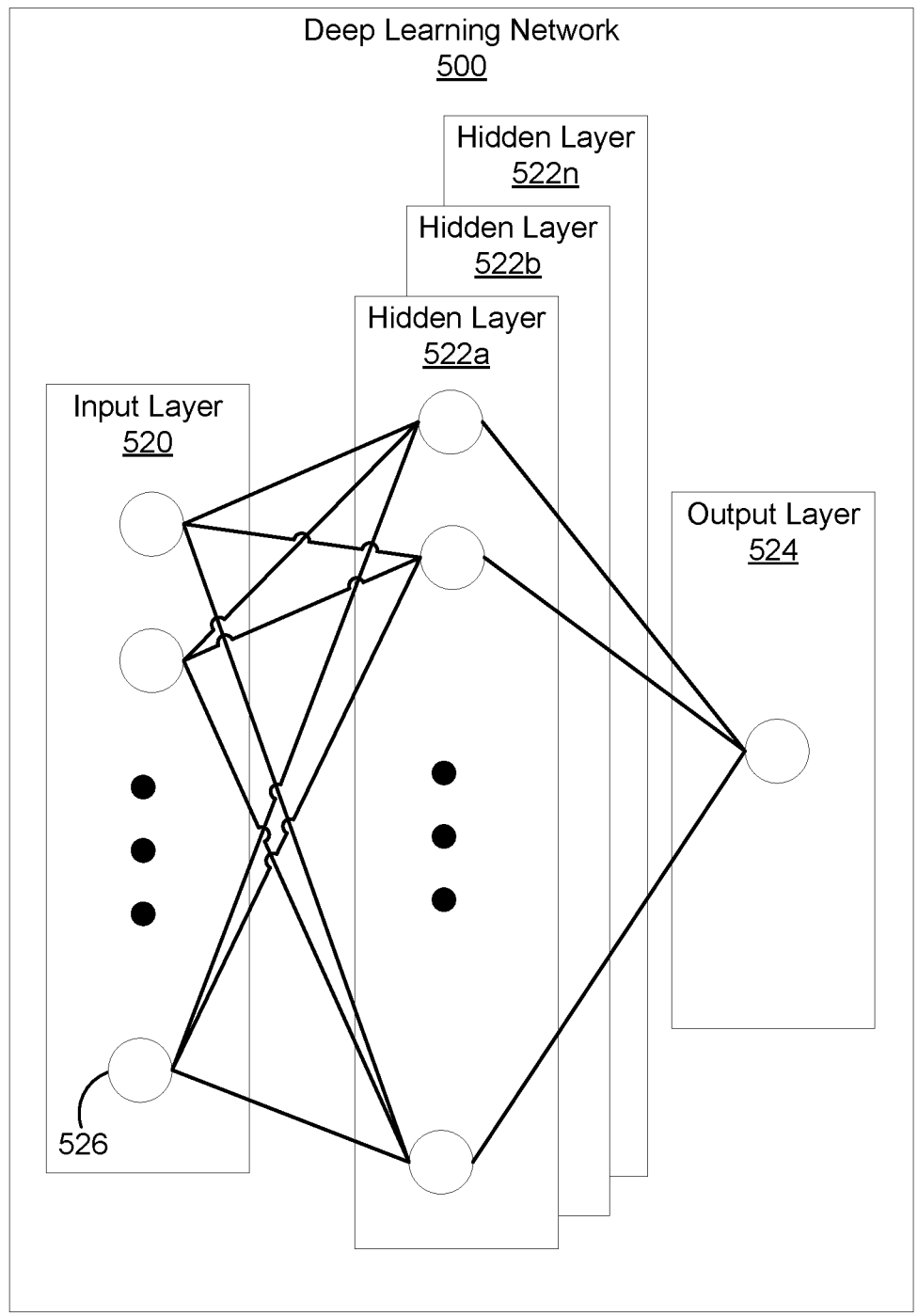
FIG. 5 is a block diagram illustrating an example of a deep learning network, in accordance with some examples.

FIG. 5 is an illustrative example of a deep learning neural network 500 that can be used by the disturbance detection system 400. An input layer 520 includes input data. In one illustrative example, the input layer 520 can include data representing the factors which can cause disturbances in candidate images. The deep learning network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The deep learning network 500 further includes an output layer 524 that provides an output resulting from the processing performed by the hidden layers 522a, 522b, through 522n. In one illustrative example, the output layer 524 can provide a classification for a combination of factors which can cause a potential disturbance in a candidate image.

The deep learning network 500 is a multi-layer neural network of interconnected nodes. Each node can represent a piece of information. Information associated with the nodes is shared among the different layers and each layer retains information as information is processed. In some cases, the deep learning network 500 can include a feed-forward network, in which case there are no feedback connections where outputs of the network are fed back into itself. In some cases, the deep learning network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the hidden layer 522 can transform the information of each input node by applying activation functions to these information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 524, at which an output is provided. In some cases, while nodes (e.g., node 526) in the deep learning network 500 are shown as having multiple output lines, a node has a single output and all lines shown as being output from a node represent the same output value.

In some cases, each node or interconnection between nodes can have a weight that is a set of parameters derived from the training of the deep learning network 500. For example, an interconnection between nodes can represent a piece of information learned about the interconnected nodes. The interconnection can have a tunable numeric weight that can be tuned (e.g., based on a training dataset), allowing the deep learning network 500 to be adaptive to inputs and able to learn as more and more data is processed.

The deep learning network 500 is pre-trained to process the features from the data in the input layer 520 using the different hidden layers 522a, 522b, through 522n in order to provide the output through the output layer 524. In an example in which the deep learning network 500 is used to identify combinations of factors which can cause potential disturbances in candidate images, the deep learning network 500 can be trained using training data that includes various combinations of factors and their potential outcome for causing disturbances. For instance, training data points can be input into the deep learning network 500, with each training data point having a label indicating the classes of the one or more factors (basically, indicating to the deep learning network 500 what the factors are and what features they have).

In some cases, the deep learning network 500 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 500 is trained well enough so that the weights of the layers are accurately tuned.

For the example of detecting combinations of factors which can lead to disturbances, the forward pass can include passing a training set of factors through the deep learning network 500. The weights are initially randomized before the deep learning network 500 is trained. For a first training iteration for the network 500, the output will likely include values that do not give preference to any particular class due to the weights being randomly selected at initialization. For example, if the output is a vector with probabilities that the factors may form a combination which can cause disturbance, the probability value for each of the different classes may be equal or at least very similar (e.g., for ten possible classes, each class may have a probability value of 0.1). With the initial weights, the network 500 is unable to determine low level features and thus cannot make an accurate determination of what the classification of the factors might be. A loss function can be used to analyze error in the output. Any suitable loss function definition can be used. One example of a loss function includes a mean squared error (MSE). The MSE is defined as $E_{total}=\Sigma\frac{1}{2}(\text{target}-\text{output})^2$, which calculates the sum of one-half times the actual answer minus the predicted (output) answer squared. The loss can be set to be equal to the value of $E_{total}$.

The loss (or error) will be high for the first training data points since the actual values will be much different than the predicted output. The goal of training is to minimize the amount of loss so that the predicted output is the same as the training label. The deep learning network 500 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta\frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The deep learning network 500 can include any suitable deep network. One example includes a convolutional neural network (CNN), which includes an input layer and an output layer, with multiple hidden layers between the input and out layers. The hidden layers of a CNN include a series of convolutional, nonlinear, pooling, and fully connected layers. The deep learning network 500 can include any other deep network other than a CNN, such as an autoencoder, a deep belief nets (DBNs), a Recurrent Neural Networks (RNNs), among others.

Figure 6:
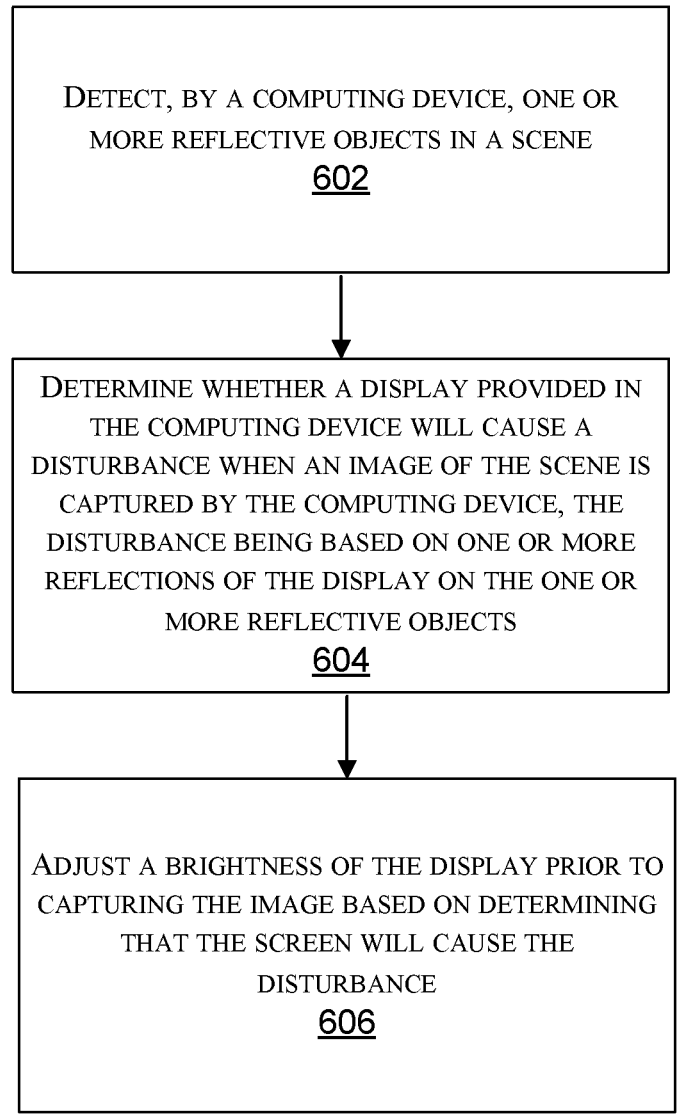
FIG. 6 is a flowchart illustrating an example of capturing one or more images, in accordance with some examples.

FIG. 6 is a flowchart illustrating an example of a process 600 for capturing one or more images using the techniques described herein. In some examples, the process 600 can be performed by the device 102 of FIG. 1.

In some examples, the device 102 can be used for capturing one or more candidate images, a smart capture mode. In some examples, the device 102 can detect that it has been placed in a smart capture mode. For example, in the smart capture mode, an image captured by the device 102 can include a candidate image such as a self-portrait using a front facing camera 104 of the device 102, the front facing camera 104 oriented in a direction aligned with a display 106 of the device 102. The smart capture mode can be enabled on the device 102 based on a user input. In some examples, the smart capture mode can be flexibly enabled or disabled automatically. For example, the device 102 can be configured with settings for various applications. For some applications, the settings can include the smart capture mode being enabled, while for some applications, the settings can include the smart capture mode being disabled. For example, the device 102 can include a laptop, tablet, smartphone, or other device for executing applications related to playing video content, video conferencing, browsing content, programming, or others on the display 106. In such applications, the display 106 may not be primarily used for previewing images to be captured by the camera 104 of the device 102. For example, the display 106 can either partially display or not display the preview image 108 while executing the applications. It is possible that for such applications, that a disturbance in a candidate image such as a self-portrait captured while the application is executing may be considered as acceptable, the disturbance caused due to reflection of the display 106 on a reflective object. Thus, the settings for such applications may include the smart capture mode being disabled.

In another example, an application which can execute on the device 102 can include a camera or photography related application. For example, the application can include an option for capturing a candidate image using the front facing camera 104. The application can include optional enhancement options to an image preview, such as augmented reality based enhancements where the user 110 may add or modify certain features to their self-portrait. For such applications where the self-portrait may be the focus of the application, the display 106 may be primarily dedicated to the application. It is possible that for such applications, the user 110 may find a temporary dimming or turning off of the display 106 to be acceptable, as this may not disrupt any other application for which the display 106 may be used in parallel. For such applications, the settings may include the smart capture mode being enabled. It will be understood that these examples are merely illustrative and there may be many other options for enabling and/or disabling the smart capture mode. The device 102 can include various mechanisms for detecting that the smart capture mode has been enabled or disabled. An operating system executing on the device 102 can provide this information to the device 102.

At block 602, the process 600 includes detecting, by a computing device, one or more reflective objects in a scene. In some examples, the detecting the one or more reflective objects can be performed by one or more engines of the device 102 while the smart capture mode is enabled. For example, the device 102 can include an object recognition system 300. The object recognition system 300 can include various object detection and/or recognition techniques for automatically detecting the one or more reflective objects in the preview of the image. For example, the object detection and/or recognition techniques use one or more machine learning operations for recognizing the one or more reflective objects. In some examples, the deep learning network 500 can be used for detecting the one or more reflective objects 306b and 306c.

At block 604, the process 600 includes determining whether a display provided in the computing device will cause a disturbance when an image of the scene is captured by the computing device, the disturbance being based on one or more reflections of the display on the one or more reflective objects. In some examples, the disturbance can include one or more reflections of the display being present in the image of the scene captured by the computing device. In some examples, the device 102 can include an engine such as a disturbance detection system 400 to determine whether the display 106 will cause the disturbance in the image when the image is captured. For example, the disturbance detection system 400 can use one or more machine learning operations for determining whether one or more factors associated with the display and the one or more reflective objects will cause the disturbance in the image. In some examples the one or more factors can include one or more relative positions between the display and the one or more reflective objects, ambient light, brightness of the display, or shapes of the one or more reflective objects. In some examples, the deep learning network 500 can be used for determining whether a combination of factors related to the display 106 and the one or more reflective objects 306b and 306c can cause the disturbance.

In some examples, determining whether the display provided in the device will cause the disturbance in the image when the image is captured can include using one or more machine learning operations for recognizing a reflection of the display in the preview image. For example, the disturbance detection system 400 can analyze (e.g., using one or more machine learning techniques for object recognition) the preview image 108 and detect whether it contains the reflection 114 of the display 106. In various examples, the one or more reflective objects can include one or more spectacles, helmet visors, reflective wearable devices, reflective background surfaces, and/or any other reflective object. The disturbance detection system 400 can analyze preview images of such reflective objects when they are detected, to determine whether a display shaped object of significant brightness is present within the reflective object in the preview image. If such a display shaped object is detected, then it can be determined that there is disturbance in the image to be captured.

At block 606, the process 600 includes adjusting a brightness of the display prior to capturing the image based on determining that the display will cause the disturbance. For example, if the disturbance detection system 400 detects that a disturbance will be caused based on the reflection of the display 106 on one or more of the reflective objects 306b, 306c, the display control 404 can be used to adjust a brightness of the display 106 prior to capturing the candidate image. For example, adjusting the brightness of the display 106 prior to capturing the image can include temporarily dimming the display or turning off the display. In some examples, the brightness of the display can be adjusted by changing a content being displayed to display a black light or dark light such that the display which does not emit significant bright light which may cause reflections. In other examples, the display 106 can be dimmed or turned off using a combination of firmware, or other controls for causing such an effect.

In some examples of the smart capture mode, the brightness of the display can be retained at its current state while capturing the image upon determining that the display will not cause the disturbance. For example, if the disturbance detection system 400 does not detect a disturbance, then the brightness of the display 106 is not adjusted as discussed above in the case when a disturbance is detected.

In some examples the smart capture mode described herein can be used for capturing still images such as candidate images or self-portraits. In some examples, the smart capture mode can be used for capturing video. For example, the display 106 can be temporarily dimmed or turned off for a duration of time during which the user 110 may capture a video using the front facing camera.

In some examples, there can be light emitting sources other than the display 106 which can cause a disturbance in the captured images. In such instances, the disturbance can include undesirable reflections of such light emitting sources being present in the captured images. In some cases, the disturbances can also be based on the light emitting sources affecting the exposure of the image in an undesirable manner. For example, if there are light emitting sources such as light fixtures, televisions, computer displays, displays on appliances or other electronic devices, etc., present in an environment where an image is to be captured, it is possible that reflections from such light emitting sources on reflective objects in the environment may appear in the image. In some cases it is possible that light emitting sources such as the light fixtures (e.g., a light bulb) may be of high brightness or intensity which may cause images captured in the environment to be over-exposed or under-exposed.

In some examples, one or more light emitting devices can be smart devices or network-connected devices (e.g., Internet of Things (IoT)) that can be remotely controlled over a network by one or more other devices (e.g., using a mobile device such as a smartphone, a tablet computer, a personal computer, a laptop, a wearable device, a virtual reality (VR) device, an augmented reality (AR) device or other extended reality (XR) device, and/or other device). In such examples, the brightness of such light emitting devices can be adjusted before an image is captured in a way that the disturbance from the light emitting devices on the captured image can be minimized. For example, the intensity of a smart bulb or a television can be adjusted to a desired setting prior to capturing the image. For example, a mobile device with a camera used for capturing the image may be configured to communicate with the smart bulb or television to adjust their brightness settings in a manner which can reduce disturbance and enhance image quality. In some cases, a flash setting on the camera can be selectively used to combat the effect of other light emitting sources such as the smart bulb or television. In some examples, the different light emitting sources can be individually controlled to obtain an optimal combination of ambient light and minimize disturbances on images captured by the mobile device.

In some examples, a disturbance detection system such as the disturbance detection system 400 can be used for identifying light emitting sources that may potentially cause disturbances in the images captured by an electronic device in the environment. In some examples, a user of the electronic device can manually provide an input which can cause adjustments to the light emitting sources. For example, the user may provide input in the form of one or more voice commands, one or more gestures, gaze input using an XR device (e.g., a VR head mounted display, AR glasses, or other XR device), manual input, etc. In some examples, entering an image capture mode of a camera (e.g., enabling a camera function) on the electronic device can be interpreted as a trigger for adjusting brightness of light emitting sources in the environment in which the electronic device is present.

In some examples, an electronic device may be capable of capturing panoramic images where a camera may pan a scene and capture multiple frames which may form an image. In such cases, the entire panoramic scene that may be captured in the image can be examined for potential disturbances (e.g., reflective objects can be identified on the fly as the camera pans) and the display on the electronic device can be selectively adjusted for each frame which may be used in forming the panoramic image.

In some examples, three dimensional (3D) images can be formed by rotating a camera to capture 3D images of an environment. In such examples, the disturbance minimization techniques can be similarly applied to identify potential disturbances in individual images which make up the 3D images and disturbance minimization can be selectively applied for each of the individual images.

In some examples where an electronic device is used for recording videos, the exposure settings can be controlled by controlling light emitting sources (as previously described) for the duration of the video recording. In some cases, if a real time preview of the video is displayed on a display of the electronic device while the video is being captured and this preview may lead to disturbances, then such disturbances can be minimized by adjusting a brightness of such previews, minimizing (e.g., to a thumbnail view) the preview, etc.

Figure 7:
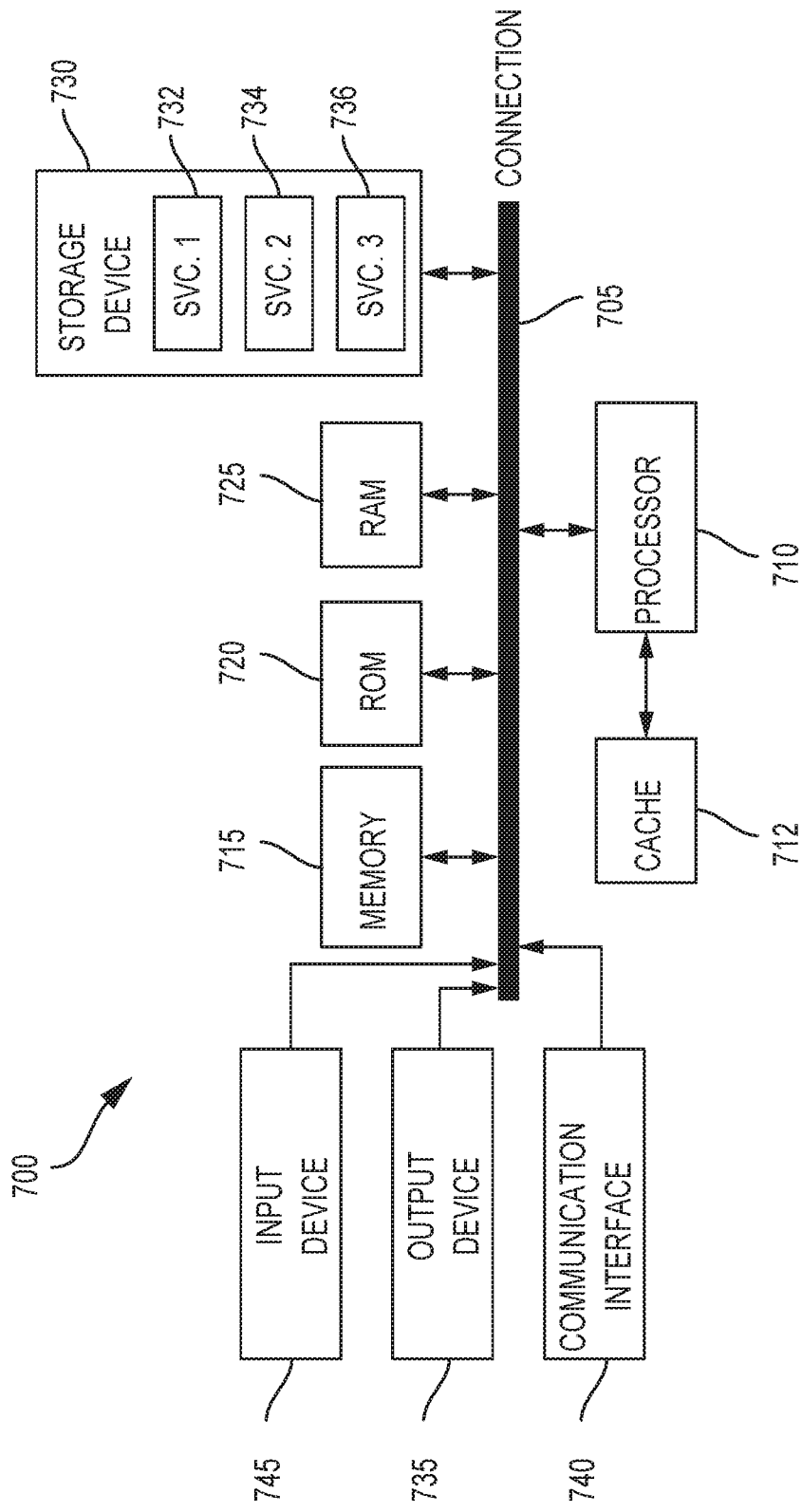
FIG. 7 is a block diagram illustrating an example computing device architecture of an example computing device which can implement the various techniques described herein

In some examples, the process 600 may be performed by a computing device or apparatus, such as a computing device having the computing device architecture 700 shown in FIG. 7. In one example, the process 600 can be performed by a computing device with the computing device architecture 700 implementing the image processing system 200. The computing device can include any suitable device, such as a mobile device (e.g., a mobile phone), a tablet computer, a laptop computer, a wearable device with a display or screen, a virtual reality device (e.g., a head-mounted display), an augmented reality device, and/or any other computing device with the resource capabilities to perform the process 600. In some cases, the computing device or apparatus may include various components, such as one or more input devices, one or more output devices, one or more processors, one or more microprocessors, one or more microcomputers, and/or other component that is configured to carry out the steps of process 600. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

Process 600 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

FIG. 7 illustrates an example computing device architecture 700 of an example computing device which can implement the various techniques described herein. For example, the computing device architecture 700 can implement the one or more processes described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including a computing device memory 715, such as a read only memory (ROM) 720 and a random access memory (RAM) 725, to the processor 710.

The computing device architecture 700 can include a cache of a high-speed memory connected directly with, in close proximity to, or integrated as part of the processor 710. The computing device architecture 700 can copy data from the memory 715 and/or the storage device 730 to the cache 712 for quick access by the processor 710. In this way, the cache 712 can provide a performance boost that avoids the processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general purpose processor and a hardware or software service, such as service 1 732, service 2 734, and service 3 736 stored in the storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

The storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include the services 732, 734, 736 for the controlling processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method for capturing one or more images, the method comprising:
   detecting, by a computing device, one or more reflective objects in a scene;
   determining whether one or more factors associated with a display provided in the computing device and the one or more reflective objects will cause a disturbance in an image of the scene when the image is captured by the computing device, the disturbance being based on one or more reflections of the display on the one or more reflective objects, wherein the one or more factors comprise at least one of a respective relative position between the display and each respective reflective object of the one or more reflective objects, ambient light, brightness of the display, or a respective shape of each respective reflective object of the one or more reflective objects; and
   adjusting a brightness level of the display prior to capturing the image based on determining that the display will cause the disturbance.

2. The method of claim 1, wherein adjusting the brightness level of the display prior to capturing the image comprises dimming the display or turning off the display.

3. The method of claim 1, wherein adjusting the brightness level of the display prior to capturing the image comprises displaying a dark light or black light.

4. The method of claim 1, further comprising:
   returning the display to a previous state upon capturing the image, the previous state being prior to the brightness level of the display being adjusted.

5. The method of claim 4, wherein the previous state comprises a preview of the scene displayed on the display.

6. The method of claim 1, wherein detecting the one or more reflective objects comprises using one or more machine learning operations for recognizing the one or more reflective objects.

7. The method of claim 1, further comprising using one or more machine learning operations for determining whether the one or more factors associated with the display and the one or more reflective objects will cause the disturbance in the image.

8. The method of claim 1, wherein determining whether the display will cause the disturbance when the image is captured comprises using one or more machine learning operations for recognizing a reflection of the display in the scene.

9. The method of claim 1, wherein capturing the image comprises capturing a self-portrait using a front facing camera of the computing device, the front facing camera oriented in a direction aligned with the display.

10. The method of claim 1, further comprising:
    retaining the brightness level of the display while capturing the image upon determining that the display will not cause the disturbance.

11. The method of claim 1, wherein the one or more reflective objects comprise one or more spectacles, helmet visors, reflective wearable devices, or reflective background surfaces.

12. The method of claim 1, wherein detecting one or more reflective objects in the scene comprises detecting one or more reflective objects in a preview of the scene displayed on the display.

13. The method of claim 1, wherein the disturbance comprises one or more reflections of the display being present in the image of the scene captured by the computing device.

14. An apparatus for capturing one or more images, the apparatus comprising:
    a memory; and
    a processor implemented in circuitry and configured to:
       detect one or more reflective objects in a scene;
       determine whether one or more factors associated with a display provided in the apparatus and the one or more reflective objects will cause a disturbance in an image of the scene when the image is captured by the apparatus, the disturbance being based on one or more reflections of the display on the one or more reflective objects, wherein the one or more factors comprise at least one of a respective relative position between the display and each respective reflective object of the one or more reflective objects, ambient light, brightness of the display, or a respective shape of each respective reflective object of the one or more reflective objects; and
       adjust a brightness level of the display prior to capturing the image based on determining that the display will cause the disturbance.

15. The apparatus of claim 14, wherein, to adjust the brightness level of the display prior to capturing the image, the processor is configured to dim the display or turning off the display.

16. The apparatus of claim 14, wherein, to adjust the brightness level of the display prior to capturing the image, the processor is configured to display a dark light or black light.

17. The apparatus of claim 14, wherein the processor is further configured to:
    return the display to a previous state upon capturing the image, the previous state being prior to the brightness level of the display being adjusted.

18. The apparatus of claim 17, wherein the previous state comprises a preview of the scene displayed on the display.

19. The apparatus of claim 14, wherein, to detect the one or more reflective objects, the processor is configured to use one or more machine learning operations for recognizing the one or more reflective objects.

20. The apparatus of claim 14, wherein, to determine whether the display will cause the disturbance when the image is captured, the processor is configured to use one or more machine learning operations for determining whether the one or more factors associated with the display and the one or more reflective objects will cause the disturbance in the image.

21. The apparatus of claim 14, wherein, to determine whether the display will cause the disturbance when the image is captured, the processor is configured to use one or more machine learning operations for recognizing a reflection of the display in the scene.

22. The apparatus of claim 14, wherein, to capture the image, the processor is configured to capture a self-portrait using a front facing camera of the apparatus, the front facing camera oriented in a direction aligned with the display.

23. The apparatus of claim 14, wherein the processor is further configured to:
retain the brightness level of the display while capturing the image upon determining that the display will not cause the disturbance.

24. The apparatus of claim 14, wherein the one or more reflective objects comprise one or more spectacles, helmet visors, reflective wearable devices, or reflective background surfaces.

25. The apparatus of claim 14, wherein the disturbance comprises one or more reflections of the display being present in the image of the scene captured by the apparatus.

26. The apparatus of claim 14, wherein the apparatus comprises a mobile device with at least one camera for capturing one or more images.

27. The apparatus of claim 14, wherein the one or more reflective objects comprise one or more spectacles, helmet visors, reflective wearable devices, or reflective background surfaces.

28. The apparatus of claim 14, wherein detecting one or more reflective objects in the scene comprises detecting one or more reflective objects in a preview of the scene displayed on the display.

29. A non-transitory computer-readable medium having stored thereon instructions that, when executed by one or more processors, cause the one or more processors to:
detect one or more reflective objects in a scene;
determine whether one or more factors associated with a display provided in a computing device will cause a disturbance in an image of the scene when the image is captured by the computing device, the disturbance being based on one or more reflections of the display on the one or more reflective objects, wherein the one or more factors comprise at least one of a respective relative position between the display and each respective reflective object of the one or more reflective objects, ambient light, brightness of the display, or a respective shape of each respective reflective object of the one or more reflective objects; and
adjust a brightness level of the display prior to capturing the image based on determining that the display will cause the disturbance.

30. An apparatus for capturing one or more images, the apparatus comprising:
means for detecting one or more reflective objects in a scene;
means for determining whether a display provided in the apparatus will cause a disturbance when an image of the scene is captured by the apparatus, the disturbance being based on one or more reflections of the display on the one or more reflective objects; and
means for adjusting a brightness of the display prior to capturing the image based on determining that the display will cause the disturbance.

* * * * *